(12) United States Patent
Lari et al.

(10) Patent No.: US 7,398,531 B2
(45) Date of Patent: Jul. 8, 2008

(54) PROVIDING COMMON MEMORY MANAGEMENT CODE TO OBJECTS THAT ARE INSTANCES OF DIFFERENT CLASSES

(75) Inventors: Mohammad Shoaib Lari, Palo Alto, CA (US); Ravikanth Kasamsetty, Union City, CA (US); Srinath Krishnaswamy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 686 days.

(21) Appl. No.: 10/209,469

(22) Filed: Jul. 30, 2002

(65) Prior Publication Data

US 2005/0177836 A1  Aug. 11, 2005

Related U.S. Application Data

(60) Provisional application No. 60/378,872, filed on May 7, 2002, provisional application No. 60/384,647, filed on May 31, 2002.

(51) Int. Cl.
  *G06F 3/00* (2006.01)
  *G06F 9/44* (2006.01)
  *G06F 9/46* (2006.01)
  *G06F 13/00* (2006.01)
(52) U.S. Cl. ........................ 719/320; 717/108; 717/116
(58) Field of Classification Search ......... 719/310–320, 719/328–330; 717/106, 108, 116
  See application file for complete search history.

(56) References Cited

U.S. PATENT DOCUMENTS

| 5,923,877 | A  | 7/1999 | Berner et al. |
| 5,951,680 | A  | 9/1999 | Redlin et al. ................... 713/1 |
| 6,219,678 | B1 | 4/2001 | Yelland et al. |
| 6,327,606 | B1 | 12/2001 | Chidambaran |
| 6,480,862 | B1 | 11/2002 | Gall |
| 6,484,247 | B1 | 11/2002 | Gendron et al. ............. 711/170 |
| 6,487,563 | B1 | 11/2002 | Houldsworth |
| 6,763,440 | B1 | 7/2004 | Traversat et al. |

(Continued)

OTHER PUBLICATIONS

Dranith, Resource Management Templates, GLProgramming, pp. 1-4.

(Continued)

*Primary Examiner*—William Thomson
*Assistant Examiner*—Diem K Cao
(74) *Attorney, Agent, or Firm*—Hickman Palermo Truong & Becker LLP

(57) ABSTRACT

A method for providing memory management for objects is described. Specifically, techniques are described for providing common memory management code to objects that are instances of different classes and for releasing a memory management subtree that starts with a particular object in the memory management tree. A memory management template provides common pre-processor memory management code. A specialized version of the memory management template is used to create a specialized template subclass. When a memory management operator of an object that is an instance of the specialized template subclass is invoked the common memory management code in the specialized template is executed. Memory is associated with each object in a hierarchical tree. Data for the memory is maintained that reflects the hierarchical tree relationship between the objects. A subtree and the associated memory can be released without an application program tracking the relationships.

28 Claims, 14 Drawing Sheets

U.S. PATENT DOCUMENTS

| | | | |
|---|---|---|---|
| 6,874,074 B1 | 3/2005 | Burton et al. | 711/170 |
| 2002/0087744 A1 | 7/2002 | Kitchin | 709/331 |
| 2002/0138506 A1 | 9/2002 | Shuf et al. | 707/206 |
| 2002/0169786 A1* | 11/2002 | Richek | 707/103 R |
| 2003/0097537 A1 | 5/2003 | Bollella et al. | 711/170 |

OTHER PUBLICATIONS

Levine et al, Object Lifetime Manager, Jan. 2000, pp. 1-16.

Cleeland et al, External Polymorphism, C++ Report magazine, Sep. 1998, pp. 1-11.

David R. Hanson, "Fast Allocation and Deallocation of Memory Based on Object Lifetimes," Software Practice & Experience, vol. 20, No. 1, 1990, XP 000095792, pp. 5-12.

Woo Hyong Lee, et al., "Evaluation of a High-performance Object Reuse Dynamic Memory Alllocation Policy for C++ Programs," IEEE, 2000, XP-002145287, pp. 386-391.

"C++ Templates Tutorial" Microsoft Corporation, XP-002297121 (1997) pp. 1-13.

"Factory Method"/"Template Method" XP-002297122, pp. 107-116 and 325-330.

PCT/US03/13310, International Search Report.

PCT/US03/13310, copy of current claims.

PCT/US 03/13310 International Preliminary Examination Report, dated Apr. 20, 2005, pp. 1-6.

PCT/US 03/13310, Current Claims 1-30, pp. 1-5.

* cited by examiner

```
                    MM Template 200
template<class T>
class MM: public T
                  201
    {
    public:
        MM(void * hndlp);              202
        void* operator new(size_t size, void * hndlp);    204
        void operator delete(void * ptr);     205
    protected:
        void * hndlp_;    206
    }
```

```
              MM Template's Constructor 210
template<class T>
MM<T>::MM(void * hndlp): hndlp_(hndlp)
        {      211                    212
        }
```

```
              MM Template's new operator 230
template<class T>
void* MM<T>::operator new(size_t size, void * hndlp)
        {       231 if no hndlp then
                return new char[size];    232
            else
                use hndlp pointer to manipulate heap    233
        }
```

```
              MM Template's delete operator 240
template<class T>
void* MM<T>::operator delete(void * hndlp)
        {       241 if hndlp then
                use hndlp pointer to manipulate heap    242
        }
```

FIG. 2

ConnectionAbs Class 300

```
class ConnectionAbs
    {
    public:
        virtual StatementAbs* createStatement(char* stmt);  ⟵ 301

}
```

StatementAbs Class 310

```
class StatementAbs
    {
    public:
        virtual ResultsetAbs* execQuery();  ⟵ 311

}
```

ResultsetAbs Class 320

```
class ResultsetAbs
    {

ConnectionSTS Class 400 class ConnectionSTS: public MM<ConnectionAbs>
   {                                                            401
   public:
      ConnectionSTS(void * hndlp, other parameters); 402
      StatementAbs* createStatement(char * stmt); 403
   protected:
      other data members; 405
   }

---

StatementSTS Class 410 class StatementSTS: public MM<StatementAbs>
   {                                                          411
   public:
      StatementSTS(void * hndlp, char* stmt); 412
      ResultsetAbs* execQuery(); 413
   protected:
      char* stmt_; 415
   }

---

ResultsetSTS Class 420 class ResultsetSTS: public MM<ResultsetAbs>
   {                                                          421
   public:
      ResultsetSTS(void * hndlp); 422

ConnectionSTS's Constructor 500

ConnectionSTS::ConnectionSTS(void * hndlp, other parameters)
{
    MM<ConnectionAbs>::hndlp_ = hndlp; ⟋ 501
    other data members = other parameters; ⟋ 502
}

---

ConnectionSTS's createStatement method 510

StatementSTS * ConnectionSTS::createStatement(char* stmt)
{
    return (new(MM<ConnectionAbs>::hndlp_)
            511a
        StatementSTS(MM<ConnectionAbs>::hndlp_, stmt) ); ⟋ 511
}          511b

---

StatementSTS's Constructor 520

StatementSTS::StatementSTS(void * hndlp, char * stmt)
{
    MM<StatementAbs>::hndlp_ = hndlp; ⟋ 521
    stmt_ = stmt; ⟋ 522
}

---

StatementSTS's execQuery method 530

ResultsetSTS * StatementSTS::execQuery(char* stmt)
{
ResultsetSTS * rs;
rs = new(MM<StatementAbs>::hndlp_)
      532a
    ResultsetSTS(MM<StatementAbs>::hndlp_); ⟋ 532;
      532b execute a query using the stmt parameter to
    obtain a result set and set in rs;
return rs;
}

FIG. 5A

ResultsetSTS's Constructor 540

ResultsetSTS::ResultsetSTS(void * hdnlp)
{
    MM<ResultsetAbs>::hndlp_ = hndlp;  ⟵ 541
}

FIG. 5B

Application Program 600

```
{
pH1 = pointer to a common heap                               601
ConnectionAbs * conn = createConnection (pH1, other parameters);   602
StatementAbs * stmt = conn->createStatement("select a,b from t");   603
ResultsetAbs * rs = stmt->execQuery();   604
}
``` createConnection 610

```
ConnectionSTS * createConnection(void * hndlp, other parameters);
    {
                                            611a
    return MM<ConnectionAbs>::new(hndlp)
            ConnectionSTS(hndlp, other parameters);   611
    }                    611b
```

FIG. 6

Connection Class 900

```
class Connection
    {
    public:
        Connection(void * hndlp, other parameters);
        Statement* createStatement(char * stmt);
    protected:
        other data members;
        void* hndlp_;    ⟋906
        void* children;  ⟋907
        void* siblings;  ⟋908
    }
```

Statement Class 910

```
class Statement
    {
    public:
        Statement(void * hndlp, char* stmt);
        Resultset* execQuery();
    protected:
        char* stmt_;
        void* hndlp_;    ⟋916
        void* children;  ⟋917
        void* siblings;  ⟋918
    }
```

Resultset Class 920

```
class Resultset
    {
    public:
        Resultset(void * hndlp);
    protected:
        void* hdnlp_;    ⟋923
        void* children;  ⟋924
        void* siblings;  ⟋925
    }
```

FIG. 9

Connection's Constructor 1000

Connection::Connection(void * hndlp, other parameters)
{
    hndlp_ = hndlp; ⟋ 1001
    other data members = other parameters;
}

Connection's createStatement method 1010

Statement * Connection::createStatement(char* stmt)
{
  hndlp__ = createSubHeap(hndlp_); ⟋ 1011
  initialize children and sibling pointers appropriately ⟋ 1013
  return (new(hndlp__) Statement(hndlp__, stmt) ); ⟋ 1012
}

Statement's Constructor 1020

Statement::Statement(void * hndlp, char * stmt)
{
    hndlp_ = hndlp; ⟋ 1021
    stmt_ = stmt;
}

Statement's execQuery method 1030

Resultset * Statement::execQuery(char* stmt)
{
  Resultset * rs;
  hndlp__ = createSubHeap(hndlp_); ⟋ 1032
  initialize children and sibling pointers appropriately
  rs = new(hndlp__) ResultsetImp(hndlp__);
  execute a query using the stmt parameter to
      obtain a result set and set in rs;
  return rs;
}

FIG. 10A

Resultset's Constructor 1040

```
Resultset::Resultset(void * hdnlp)
    {
        hndlp_ = hndlp;    1041
    }
```

FIG. 10B

Application Program 1100

```
{
pH1 = pointer to a common heap
Connection * conn = createConnection (pH1, other parameters);
Statement * stmt = conn->createStatement("select a,b from t");
Resultset * rs = stmt->execQuery();
}
``` createConnection 1110

```
Connection * createConnection(void * hndlp, other parameters);
    {
    return new(hndlp) Connection(hndlp, other parameters);
    }
```

FIG. 11

PROVIDING COMMON MEMORY MANAGEMENT CODE TO OBJECTS THAT ARE INSTANCES OF DIFFERENT CLASSES

PRIORITY CLAIM AND CROSS-REFERENCE TO RELATED APPLICATIONS

This application is related to and claims priority from U.S. Provisional Application Ser. No. 60/378,872, filed on May 7, 2002, entitled "Providing Common Memory Management Code to Objects that are Instances of Different Classes" by Mohammad Shoaib Lari, Ravikanth Kasamsetty, and Srinath Krishnaswamy, the entire disclosure of which is hereby incorporated by reference for all purposes as if fully set forth herein. This application is related to and claims priority from U.S. Provisional Application Ser. No. 60/384,647, filed on May 31, 2002, entitled "Providing Common Memory Management Code to Objects that are Instances of Different Classes", by Shoaib Lari, Ravikanth Kasamsetty, and Srinath Krishnaswamy, the entire disclosure of which is hereby incorporated by reference for all purposes as if fully set forth herein.

This application is related to U.S. Provisional Application Ser. No. 60/378,871, filed on May 7, 2002, entitled "Simplified Deallocation of Memory for Programming Objects", by Shoaib Lari, Ravikanth Kasamsetty, and Srinath Krishnaswamy, the entire disclosure of which is hereby incorporated by reference for all purposes as if fully set forth herein. This application is related to U.S. Provisional Application Ser. No. 60/384,646, filed on May 31, 2002, entitled "Simplified Deallocation of Memory for Programming Objects", by Shoaib Lari, Ravikanth Kasamsetty, and Srinath Krishnaswamy, the entire disclosure of which is hereby incorporated by reference for all purposes as if fully set forth herein.

This application is related to U.S. application Ser. No. 10/209,514, filed on equal day herewith, entitled "Simplified Deallocation of Memory for Programming Objects", by Shoaib Lari, Ravikanth Kasamsetty, and Srinath Krishnaswamy, the entire disclosure of which is hereby incorporated by reference for all purposes as if fully set forth herein.

FIELD OF THE INVENTION

The present invention relates to memory management for objects and more specifically to providing common memory management code to objects that are instances of different classes and to releasing memory associated with a particular object in a hierarchy of objects as well as the objects below that particular object in the hierarchy.

BACKGROUND OF THE INVENTION

Memory management refers to operations and processes that are performed to manage the allocation and deallocation of memory for storing objects or other data structures. Typically, most applications use the memory management code that is supplied by the computer language that the applications are written in. However, the memory management code supplied by the computer language may not have certain desirable features such as optimization for performance, optimization for memory allocation, or releasing memory for a set of objects that have a relationship to each other. Therefore, it is advantageous for objects to have their own memory management code.

In the object-oriented world, supplying unique memory management code to an application entails overriding the new and delete operators in every class that is used to create objects in that application. The problem with this is that each class used to create objects in the application require a separate copy of the memory management code to override the new and delete operators in those classes. Having many copies of the memory management code complicates not only routine maintenance but also complicates providing enhancements. For example, whenever a bug is found in the memory management code, the memory management code in each class has to be modified.

When there is a relationship between a set of objects, an application program has to track the relationship between these objects in order to release memory associated with the objects in the proper order. For example, for any given database connection, one or more queries are executed involving statements, and resultsets are returned in response to the queries. Therefore, a hierarchical relationship exists between a database connection, and the related statements, resultsets, and streams. The connection, and related statements, resultsets, and streams can each be represented by their own object and these objects can be organized in a hierarchical tree that reflects the relationship between these objects. For example, the connection object is the top object in a hierarchical tree, the statement objects are directly under the connection object, the resultset objects are directly under the statement objects and so on. Memory is needed for executing methods associated with the objects or for performing computations on behalf of the objects, among other things. Therefore, memory is associated with each object in the hierarchical tree (hereinafter referred to as a "memory management tree").

A particular object and the objects below that object form a subtree of the hierarchical tree. For example, a particular statement object and all the objects below that particular statement object, such as resultset objects and stream objects, form a subtree of a hierarchical tree. A subtree and the memory associated with the objects in the subtree form a memory management subtree. When a particular object is no longer needed, the memory management subtree, which includes the particular object, the objects below this particular object (hereinafter referred to as "descendents" of the particular object), and the memory associated with all of these objects, is released. For example, once an application program is finished with a statement object, the statement object and all of the statement object's descendants (e.g., resultset objects and stream objects) can be released. The memory associated with these objects is also released. To do this, an application program has to track the relationship between the objects and the associated memory. The release of a memory management subtree needs to be done in such a way that other objects in the hierarchical tree and their associated memory is not released. For example, if a subtree that starts with a particular statement is released, the connection that this particular statement is associated with and the other statements associated with that connection should not be impacted.

Therefore it can be seen that there is a need not only for providing unique memory management code for an application but to provide this memory management code in a way that it is shared by all the objects that are instances of the classes used in the application. Furthermore, it can be seen that there is a need for tracking the relationship between a set of objects in a hierarchical tree and the memory associated with these objects in a way that is transparent to an application program. In so doing, the application program can issue a release for one particular object in the hierarchical tree that results in releasing the memory management subtree that starts with that particular object.

SUMMARY OF THE INVENTION

Techniques are described for providing memory management for objects. Specifically, techniques are described for providing common memory management code to objects that are instances of different classes and for releasing a memory management subtree that starts with a particular object in the memory management tree.

With regards to providing common memory management for objects, a template (hereinafter referred to as a memory management template) is used to provide common pre-processor memory management code. An abstract class, that defines memory management interfaces, is passed into this memory management template to create a "specialized template" during compilation. The specialized template is used to subclass a second class (referred to hereinafter as a "specialized template subclass"). The specialized template subclasses contain memory management executables that are generated from the common pre-processor memory management code during compile time. According to one embodiment, the specialized template subclass provides implementations for the interfaces in the abstract class. When a memory management operator, such as new or delete, of an object that is an instance of the specialized template subclass, is invoked, the memory management executable in the specialized template is executed.

For example, an abstract class A_Abs provides interfaces. A template MM<T> provides the common pre-processor memory management code that provides interfaces and implementations for a common memory manager by overloading the new and delete operators. When A_Abs is passed into the generic parameter "T" of template MM<T>, a specialized template, MM<A_Abs>, is created. During the pre-processor phase of compilation, the generic parameter T is replaced with the specified parameter A_Abs to produce executable code in the specialized template MM<A_Abs>. MM<A_Abs> is used to subclass A_STS, which is a specialized template subclass. When the new or delete operator of an object that is an instance of class A_STS is invoked, the new or delete operator in MM<A_Abs> is executed instead of the new or delete operator supplied by the computer language.

With regards to releasing a memory management subtree, memory is associated with each object in a hierarchical tree. Data for the memory is maintained that reflects the hierarchical tree relationship between the objects in the hierarchical tree. In so doing, a subtree and the associated memory can be released with a single instruction, such as a destructor, without an application program tracking the relationship between the objects and the memory associated with the objects.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram depicting a memory management template that provides common pre-processor memory management code according to an embodiment of the present invention;

FIG. 3 is a block diagram depicting abstract classes that are passed into the memory management template as specific types to provide specialized templates according to an embodiment of the present invention;

FIG. 4 is a block diagram depicting definitions of specialized template subclasses according to an embodiment of the present invention;

FIGS. 5A and 5B are block diagrams depicting methods that implement the definitions for these specialized template subclasses according to an embodiment of the present invention;

FIG. 6 is a block diagram depicting an application program that creates objects, which use common memory management according to an embodiment of the present invention;

FIGS. 9, 10A, and 10B are block diagrams depicting classes for creating objects that have a hierarchical relationship and the memory associated with these objects according to an embodiment of the present invention;

FIG. 11 is a block diagram depicting programs that create objects with classes depicted in FIGS. 9, 10A, and 10B according to an embodiment of the present invention.

DETAILED DESCRIPTION OF THE INVENTION

A method for providing common memory management code to objects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

An Overview of a Class Hierarchy Used in Common Memory Management

Figure 1:
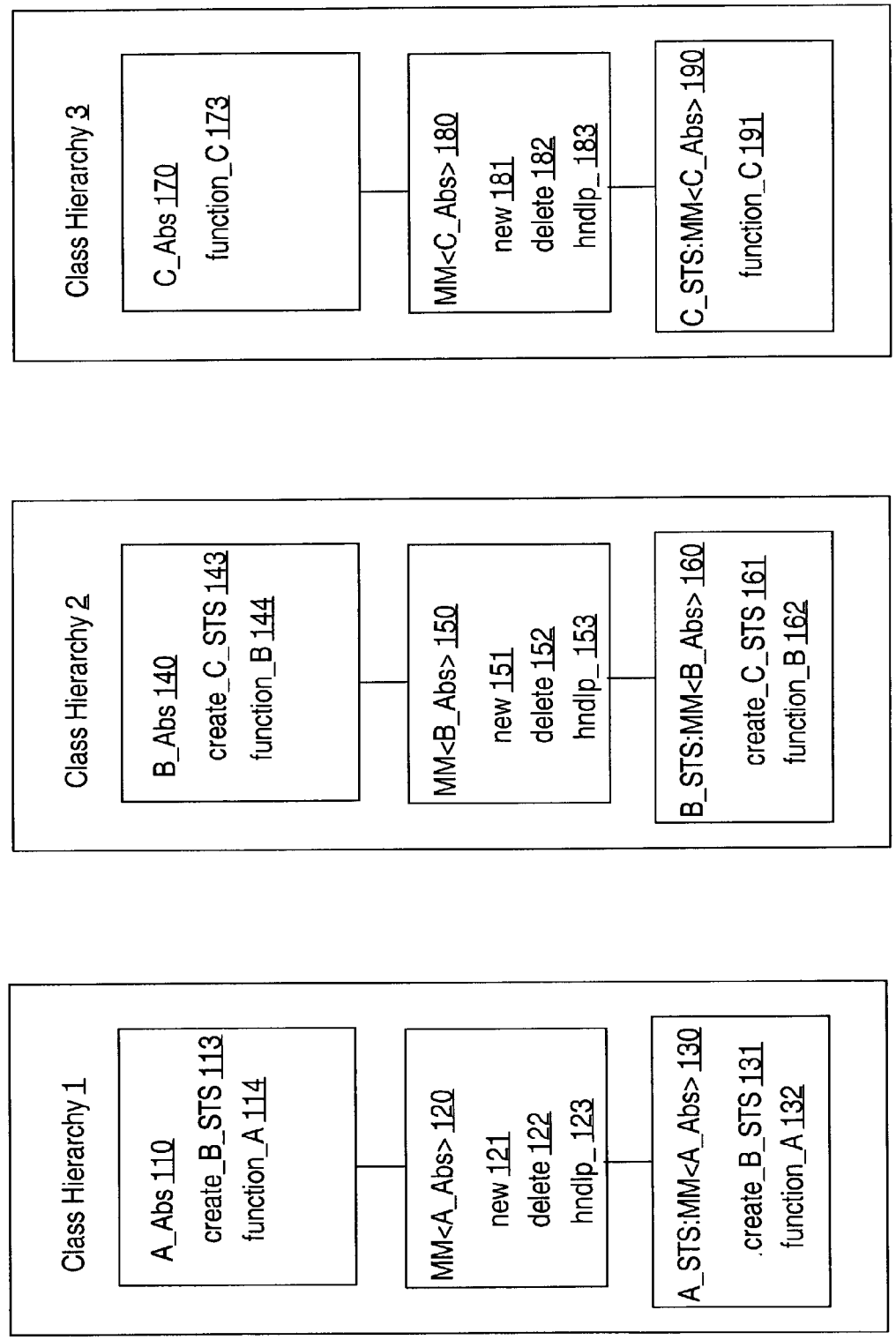
FIG. 1 is a block diagram of three class hierarchies that use a memory management template to provide common memory management code to objects that are instances of different classes according to an embodiment of the present invention.

FIG. 1 is a block diagram depicting three class hierarchies that use a memory management template to provide common memory management code to objects that are instances of different classes according to an embodiment of the present invention. All of the classes in the three class hierarchies, class hierarchy 1, class hierarchy 2, and class hierarchy 3, provide code in one form or another. Providing code refers to processes or acts that create code for subsequent compilation and execution. For example, a programmer provides code by entering source, in the form of classes, into a file where it may be accessed by a compiler for compilation. Providing code also refers to storing code in libraries for later compilation of other applications that refer to the libraries.

The three class hierarchies are used to create objects that are instances of three specialized template subclasses, A_STS:MM<A_Abs> 130, B_STS:MM<B_Abs> 160 and C_STS:MM<C_Abs> 190 (the notation of these specialized template subclasses is in the following order: 1) the name of the class, 2) a colon, and 3) the name of the specialized template that is used to subclass the class). In the case of A_STS:MM<A_Abs> 130, A_STS is the name of the class that is used to create an object and MM<A_Abs> is the name of a specialized template subclass as will be described in more detail hereinafter. These objects contain memory management executables that are all generated from common pre-processor memory management code from a memory management template as is described in more detail below.

At the top of each class hierarchy is an abstract class, A_Abs 110, B_Abs_140, and C_Abs 170, that provides interfaces (113, 114, 143, 144, 173) for methods (131, 132, 161, 162, 191) that are implemented in the specialized template subclasses (130, 160, 190). By definition, an abstract class defines interfaces for methods and/or operators but does not provide implementations for the methods and/or operators.

The common pre-processor memory management code for the new and delete operators is provided in a memory management template. The memory management template shall be referred to as MM<T> where T is a generic type parameter for passing a specific type into the memory management template. During the pre-processor phase of compilation, (1) the generic type parameter T is replaced with the specific type (e.g., A_Abs, B_Abs, C_Abs) that is passed into the memory management template, (2) the memory management template is replicated, and (3) the memory management template replications are specialized using the specific type passed into the generic parameter T to produce the specialized templates (120, 150, 180). For example, in the specialized template MM<A_Abs> 120, the abstract class A_Abs 110 is the specific type passed into the generic parameter T.

Therefore, each specialized template (120, 150, and 180) has its own memory management executable (121, 122, 151, 152, 181, 182), which originated from the one copy of memory management pre-processor code in the memory management template. For example, new 121 and delete 122 are MM<A_Abs> 120's own memory management executable. In like manner, the specialized templates (120, 150, 180) have their own copies of data members, such as hndlp_ (123, 153, and 183), used for storing data.

Although MM<A_Abs> 120, MM<B_Abs> 150, and MM<C_Abs> 180 each result in separate specialized templates that can be used to subclass another class (130, 160, 190), only one copy of the memory management pre-processor code exists. Therefore, there is only one copy of memory management pre-processor code to maintain or enhance. That one copy of memory management pre-processor code is in the memory management template, as will be discussed in more detail.

According to one embodiment, only one specialized template and one abstract class is provided. For example, assume that a generic memory management abstract class, MM_Abs is used only to provide a generic interface, such as an interface for creating an object of any type, and is used as the abstract class in the class hierarchies 1, 2, and 3. Then the specialized templates 120, 150, 180 would all be MM<MM_Abs> and the specialized template subclasses would be A_STS: MM<MM_Abs> 130, B_STS:MM<MM_Abs> 160, and C_STS:MM<MM_Abs> 190.

The specialized templates (120, 150, 180) are used to create specialized template subclasses (130, 160, 190). According to one embodiment, the specialized template subclasses (130, 160, 190) implement the non-memory management interfaces (113, 114, 143, 144, 173) of the abstract classes (110, 140, 170) in methods (131, 132, 161, 162, 191). For example, MM<A_Abs> 120 is used to subclass A_STS: MM<A_Abs> 130. The non-memory management interfaces 113 and 114 are implemented in methods 131 and 132 as will be discussed in more detail. According to one embodiment, one specialized template subclass (130, 160, or 190) provides a factory method (131 or 161) to create objects that are instances of another specialized template subclass. For example, create_B_STS 131, which is in A_STS: MM<A_Abs> 130, is a factory method that creates objects that are instances of class B_STS:MM<B_Abs> 160. As will be seen, factory methods provide a mechanism for minimizing the number of times a pointer to memory, such as a common heap, is passed as a parameter when invoking methods.

Throughout this application, various operations and actions are described as being performed by or taking place at code and instructions. However, this is just a convenient way of stating that the code of instructions, or code compiled therefrom, when executed, cause the operations and actions to be performed.

The Memory Management Template

FIG. 2 is a block diagram depicting a memory management template that provides common pre-processor memory management code according to an embodiment of the present invention. The memory management template, as depicted in FIG. 2, provides the common pre-processor memory management code, which provides interfaces (204, 205) and implementations (230, 240) for a common memory manager by overloading the new and delete operators. Classes and templates typically have two portions: (1) a definition portion that defines interfaces for methods and/or operators, and (2) an implementation portion that defines the code for the method and/or operator. MM Template 200 depicts the memory management template's definition. In the public section of MM Template 200, three interfaces (202, 204, 205) are provided. One interface 202 corresponds to the MM Template's Constructor 210. The other two interfaces (new 204 and delete 205) correspond to common memory management implementations (230 and 240). In the protected section, a data member, hndlp_206, is provided. Data member hndlp_206 is used for storing a pointer to a heap or subheap used by the common pre-processor memory management code (230, 240). "T" (201, 211, 231, 241) is the generic type parameter of the memory management template that is used to create specialized templates MM<ConnectionAbs>, MM<StatementAbs>, and MM<ResultsetAbs>, as shall be described in more detail hereinafter.

According to one embodiment, the common pre-processor memory management code is provided in MM Template's new operator 230 and MM Template's delete operator 240. MM Template's new operator 230 provides the implementation code for the operator new interface 204. If no heap exists, the new operator 230 uses the default memory manager of the language the code is implemented in to allocate memory at instruction 232. If a heap does exist, specialized processing takes place at instruction 233. This specialized processing may entail subdividing the heap, executing specialized performance instructions, returning the pointer to an existing heap, or some other kind of specialized processing. MM Template's delete operator 240 is the implementation code for the operator delete interface 205. If a heap does exist, specialized processing takes place at instruction 242. This specialized processing may entail releasing the heap, releasing a subdivision of the heap, or some other kind of specialized processing.

Abstract Classes

FIG. 3 is a block diagram depicting abstract classes that are passed into the memory management template as specific types to provide specialized templates according to an embodiment of the present invention. ConnectionAbs Class 300, StatementAbs Class 310, and ResultsetAbs Class 320 are examples of abstract classes that (1) provide interfaces that are implemented in the specialized template subclasses, and (2) are passed into the MM Template 200 as specific types. According to one embodiment, interfaces (301, 311) are provided in the abstract classes (300, 310, 320). For example, the implementations for these interfaces (301, 311) are provided in the specialized template subclass methods (510, 530). According to one embodiment, the interfaces (301, 311) in the abstract classes and the corresponding implementations (510, 530) in the specialized template subclasses are for factory methods.

Specialized Template Subclasses

FIG. 4 is a block diagram depicting definitions of specialized template subclasses according to an embodiment of the present invention. FIGS. 5A and 5B are block diagrams depicting methods that implement the definitions for these specialized template subclasses according to an embodiment of the present invention. In this example, three specialized template subclass definitions (400, 410, 420) are depicted. The specialized template subclasses are used to instantiate objects that access the common memory management code (Note that at code fragments 401, 411, and 421, classes 400, 410, and 420 are subclasses of specialized templates). For example, if object A is an instance of ConnectionSTS Class 400, object B is an instance of StatementSTS Class 410, and object C is an instance of ResultsetSTS Class 420, then objects A, B, and C have memory management executables that were all generated from the same common pre-processor memory management code in the memory management template (200, 210, 230, 240) during compile time.

Each of the specialized template subclass definitions have a constructor interface (402, 412, 422). The respective implementations of the constructor interfaces are ConnectionSTS's Constructor 500, StatementSTS's Constructor 520, and ResultsetSTS's Constructor 540. Constructors are used to create objects that are instances of the classes the constructors belong to. One of the functions that constructors may provide is the initialization of an object's data members. For example, constructors 500, 520, and 540 initialize data member hndlp_206 at instructions 501, 521, and 541 as will be described in more detail. In an alternative embodiment, data member hndlp_206 is initialized at code fragment 212 when the MM Template's Constructor 210 is invoked during the instantiation process for an object as will be described in more detail. Constructors 500 and 520 initialize data members 405 and 415 at instructions 502 and 522 respectively.

According to object oriented programming, if an object is an instance of a subclass, the constructors are called in the order of their inheritance hierarchy during the instantiation process of the object. For example, if ConnectionSTS Class 400, which is a subclass of MM<ConnectionAbs>, is used to create an object A, then ConnectionSTS's Constructor 500 is invoked after the superclass's constructor, MM<ConnectionAbs>::MM, which is a specialized version of MM Template's Constructor 210.

According to one embodiment, the specialized template subclasses provide implementations of non-memory management interfaces that are in the abstract classes while the MM template 200 provides interfaces and implementations (230, 240) of the memory management interfaces. For example, the specialized template subclass A_STS: MM<A_Abs> 130 provides implementations for non-memory management interfaces, create_B_STS 113 and function_A 114, while MM<T> provides implementations of the memory management interfaces, new 111 and delete 112.

According to another embodiment, one abstract class is used to provide only generic interfaces. For example, a generic abstract class, MM_Abs, could provide generic interfaces, such as an interface for creating an object of any type or for performing a type of process, and the generic parameter T in the memory management template, MM<T>, is replaced with MM_Abs to produce one specialized template MM<MM_Abs>. In this case, the MM_Abs would be passed into the specialized template subclasses at code fragments 401, 411, and 421.

According to one embodiment, the specialized template subclasses provide factory methods (403, 413) for creating objects that are instances of other specialized template subclasses. For example, the factory method createStatement 403 is used to create an object that is an instance of StatementSTS Class 410 as will be described in more detail. In creating objects that are instances of other specialized template subclasses, the factory method implementations (510, 530) invoke the new operator 230, at code fragments 511*a* and 532*a* respectively, to allocate memory for the objects and subsequently invoke the constructors for the other specialized template subclasses, at code fragments 511*b* and 532*b* respectively. For example, if factory method createStatement 510, which is a method in ConnectionSTS Class 400, is used to create an object A, then code fragment 511*a* invokes MM Template's new operator 230 to allocate memory for object A and StatementSTS's Constructor 520 is invoked at code fragment 511*b* to "construct" object A. Then since StatementSTS Class 410 is a subclass of MM<StatementAbs>, a specialized form of MM Template's Constructor 210, MM<StatementAbs>::MM, is invoked. According to one embodiment, when MM<StatementAbs>::MM is invoked, hndlp_206 is initialized at code fragment 212.

An Operational Example of Common Memory Management

FIG. 6 is a block diagram depicting an application program that creates objects, which use common memory management according to an embodiment of the present invention. Application program 600 creates three such objects, a ConnectionSTS object, a StatementSTS object, and a ResultsetSTS object, in a series of instructions (602, 603, and 604). To summarize, a ConnectionSTS object, conn, is created at instruction 602. A factory method in conn is invoked, at instruction 603, to create a StatementSTS object, stmt. Another factory method in stmt is invoked, at instruction 604, to create a ResultsetSTS object, rs. All three objects contain memory management executables that were generated from the common pre-processor memory management code and pointers to a common heap as will be discussed in more detail.

The memory management executables were derived from the common pre-processor code. For example, object conn contains memory management executables for MM<ConnectionAbs>: :operators new and delete, object stmt contains memory management executables for MM<StatementAbs>::operators new and delete, and object rs contains memory management executables for MM<ResultsetAbs>::operators new and delete. All of these memory management executables were derived from the common pre-processor memory management code as defined by the MM Template depicted in FIG. 2.

According to one embodiment, a common heap is shared among the objects, as will be discussed in more detail. According to one embodiment, the common heap is shared by passing a pointer into the first instruction of the series of instructions (602, 603, 604) that create objects. For example, pointer pH1 is initialized to a common heap at instruction 601. According to one embodiment, the common heap is shared among objects without passing a pointer into each instruction of the series of instructions as will be discussed in more detail. According to another embodiment, the common heap is shared among objects by passing a pointer into each instruction of the series of instructions. This would be the case if pH1 were present in the invocations of instructions 602, 603, and 604.

At instruction 601, the application program 600 initializes a pointer to a common heap. At instruction 602, the application program 600 invokes a global program, createConnection 610, that: (1) creates a ConnectionSTS object, conn, (2) returns a pointer to the conn object, and (3) saves a pointer to this common heap in the newly created conn object.

For example, the global program, createConnection 610, creates the conn object at instruction 611. Instruction 611 has two parts: an invocation of MM<ConnectionSTS>::new at code fragment 611a and an invocation of ConnectionSTS's constructor 500 at code fragment 611b. MM<ConnectionSTS>::new is a specialized version of MM Template's new operator 230, which allocates memory for the conn object at instruction 232 and returns a pointer to conn. ConnectionSTS's constructor 500 "constructs" conn by initializing MM<ConnectionAbs>::hndlp_206 at instruction 501 and by optionally initializing other data members at instruction 502. Since ConnectionSTS Class 400 is a subclass of MM<ConnectionAbs> 401, a specialized version of the MM Template's Constructor 210 is invoked.

At instructions 603 and 604, factory methods in objects are used to, among other things: (1) create other objects, and (2) communicate a pointer to the common heap to each of these other objects. To create objects, stmt and rs, factory methods, createStatement method 510 and execQuery method 540, are invoked at instructions 603 and 604 respectively. To communicate a pointer to the common heap, factory methods, createStatement and execQuery, propagate the pointer from one object to the next created object. For example, object conn is created at instruction 602 and used to communicate a common heap pointer to object stmt at instruction 603. This is accomplished by passing the pointer to the common heap member, pH1, to createConnection 610 at instruction 602. Code fragment 611a results in calling MM<ConnectionAbs>::new. Code fragment 611b results in calling the ConnectionsSTS's Constructor 500 where the pointer to the common heap is also saved in the object conn. ConnectionSTS's Constructor 500 saves the common heap pointer in MM<ConnectionAbs>::hndlp_at instruction 501. Then the saved pointer to the common heap is propagated from object conn to object stmt at instruction 603 when the factory method createStatement in conn is used to create object stmt. For example, at code fragment 511a, MM<ConnectionAbs>::hdnlp_, which is a specialized version of hndlp_206, is passed into the new operator, which allocates memory for the stmt object. Similar processing occurs with regards to object rs at instruction 604.

A Hierarchical Tree of Objects

Figure 7:
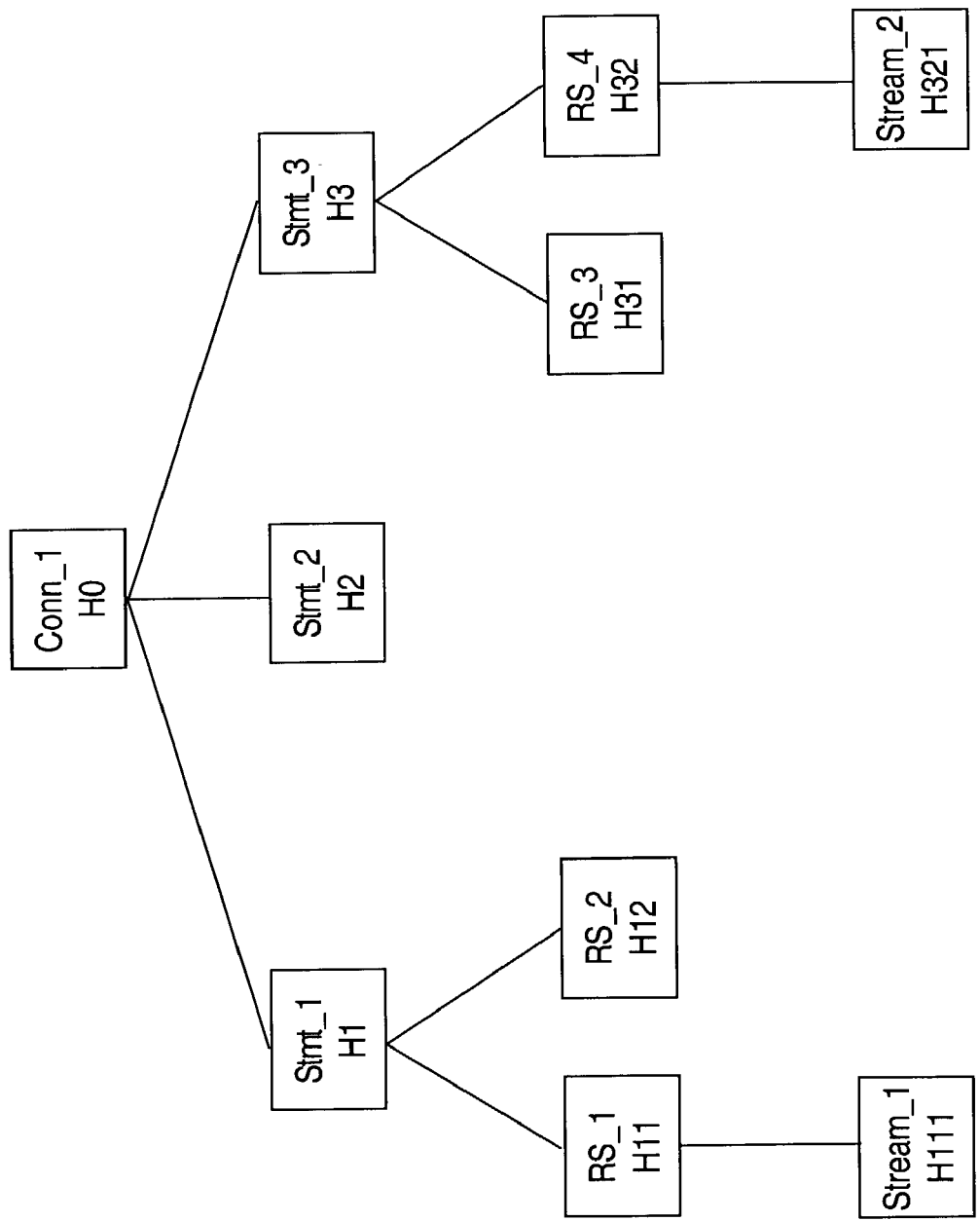
FIG. 7 is a block diagram depicting a set of objects that have a hierarchical tree relationship to each other according to an embodiment of the present invention.

FIG. 7 is a block diagram depicting a set of objects that have a hierarchical tree relationship to each other (hereinafter referred to as a "hierarchical tree") according to an embodiment of the present invention. For example, for any given database connection, one or more queries are executed involving statements. Resultsets are returned in response to the queries. Streams are obtained from resultsets in order to coordinate reading large data objects, such as Binary Large Objects, that cannot be read in one function call. Therefore, a hierarchical relationship exists between a database connection, and the related statements, resultsets, and streams. The connection, and related statements, resultsets, and streams can each be represented by an object and the objects can be organized in a hierarchical tree that reflects the relationship between the objects.

For example, Conn_1 is a connection object. Stmt_1, Stmt_2, and Stmt_3 are statement objects that represent statements used in queries for this connection. RS_1 and RS_2 are resultset objects that represent resultsets returned in response to a query using Stmt_1. RS_3 and RS_4 are resultset objects that represent resultsets returned in response to a query using Stmt_3. Streams, Stream_1 and Stream_2, are obtained from resultsets, RS_1 and RS_4 respectively. Memory (H0, H1, H2, H3, H11, H12, H31, H32, H111, H321), used for executing methods and for performing computations among other things, is associated with each object in a hierarchical tree. For example, memory H0 is associated with object Conn_1, memory H1 is associated with object Stmt_1, and so on.

Memory Associated With a Hierarchical Tree of Objects

Figure 8:
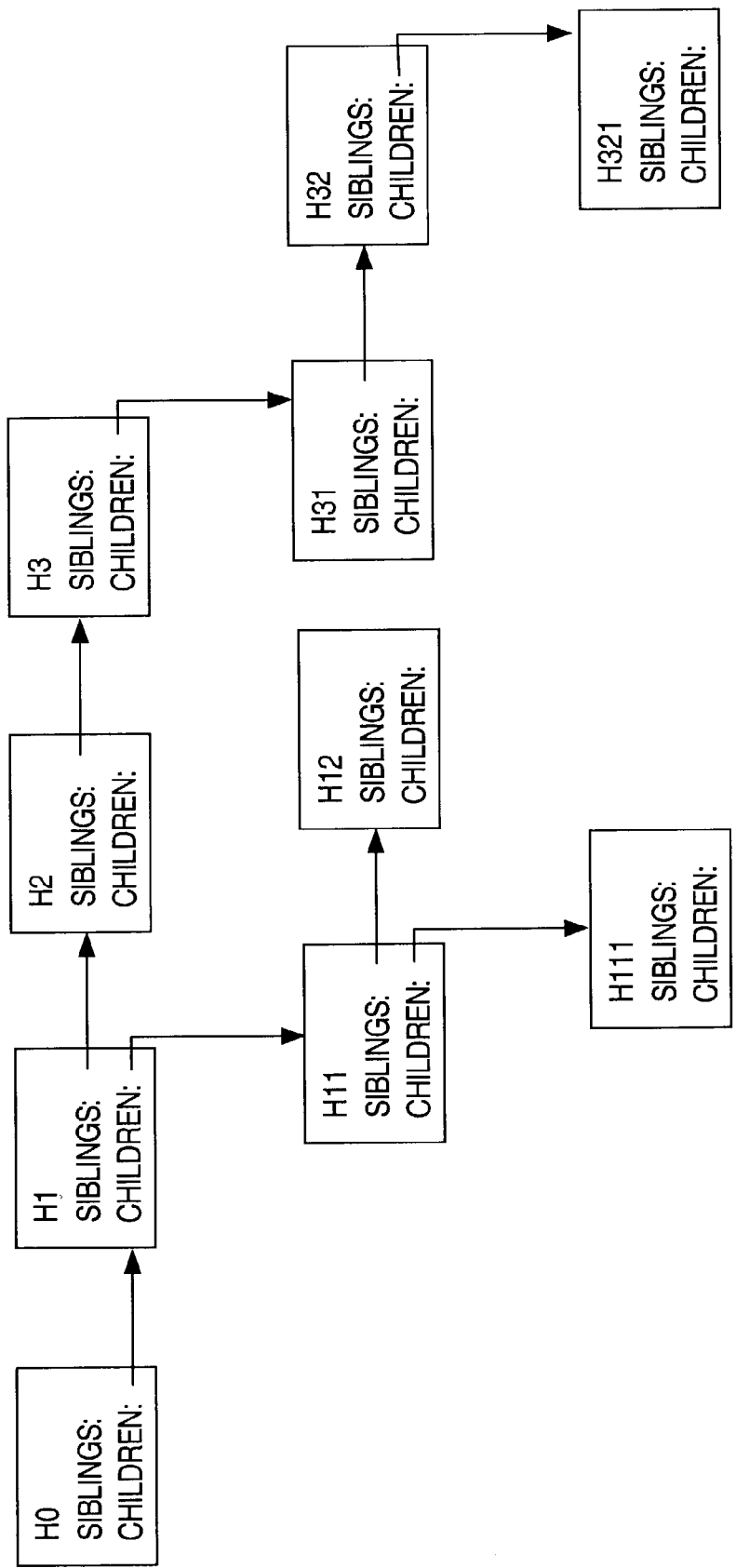
FIG. 8 is a block diagram depicting pieces of memory associated with each object of a set of objects according to an embodiment of the present invention.

FIG. 8 is a block diagram depicting pieces of memory associated with each object of a set of objects according to an embodiment of the present invention. The pieces of memory (hereinafter referred to as a hierarchical memory tree) are organized to reflect the hierarchical tree relationship of the set of objects. According to one embodiment, FIG. 8 depicts the hierarchical memory tree associated with the set of objects that are depicted in FIG. 7. For example, H0 is one piece of memory associated with object Conn_1; H1, H2, and H3 are pieces of memory associated with the statement objects Stmt_1, Stmt_2, and Stmt_3 respectively; H11, H12, H31, and H32 are pieces of memory associated with the resultset objects RS_1, RS_2, RS_3, and RS_4 respectively; H111 and H321 are pieces memory associated with stream objects Stream_1 and Stream_2.

According to one embodiment, a heap is one piece of memory associated with the top object of a hierarchical tree and subheaps of this heap are the pieces of memory associated with the rest of the objects. For example in FIG. 7, H0, which is associated with the top object Conn_1, would be a heap, and the memory associated with the rest of the objects (H1, H2, H3, etc.) are subheaps of H0.

Hierarchical data is maintained that determines the hierarchy of the hierarchical memory tree, and is maintained in such a way that the hierarchical memory tree reflects the hierarchical relationship between the set of objects in the hierarchical tree. This data could be among other things pointers and references that are maintained: (1) in data members of the set of objects, (2) in the memory associated with the set of objects, or (3) in one or more tables.

By maintaining hierarchical data for the memory that reflects the hierarchical relationship of the set of objects, a memory subtree can be released with a single request, such as an object destructor or a function, without impacting other objects in the hierarchical tree or the memory associated with the other objects in the hierarchical tree.

According to one embodiment, this hierarchical data is a pair of sibling and children pointers associated with the heap and each subheap in the hierarchical memory tree. The heap and each subheap points to a list of its own children and its own siblings. For example, the children of heap H0, which is associated with Conn_1, are subheaps H1, H2, and H3. The siblings of subheap H1 are subheaps H2 and H3.

Releasing Memory Associated With a Memory Subtree Using a Single Request

FIGS. 9, 10A, and 10B are block diagrams depicting classes for creating objects that have a hierarchical relationship and the memory associated with these objects according to an embodiment of the present invention. FIG. 9 is a block diagram depicting class definitions for the connection, statement, and resultset classes. FIGS. 10A and 10B are block diagrams depicting the methods associated with these classes. In this example, the classes are used to create connection, statement, and resultset objects. FIG. 11 is a block diagram depicting programs that create objects with classes depicted in FIGS. 9, 10A, and 10B according to an embodiment of the present invention.

According to one embodiment, releasing memory associated with a memory subtree in a single request is performed in conjunction with common memory management. In this case, the Connection class 900, Statement class 910, and the Resultset Class 920 would be subclasses of specialized templates. For example, when Connection class 900 is used to create an object A, the new operator 230 is invoked. Likewise, when object A is destroyed, a destructor in Connection class 900 (not shown) is invoked, which in turn invokes the delete operator 240. Then the delete operator 240, or a function the delete operator 240 invokes, traverses the hierarchical data to release the memory associated with object A and the subtree associated with object A. For example, if the destructor for Stmt_1, as depicted in FIG. 7, is invoked from an application program, the destructor can use the children and sibling pointers, as depicted in FIG. 8, to determine that subheaps H1, H11, H12, H111 should be released.

According to another embodiment, releasing memory associated with a memory subtree in a single request is performed without common memory management code. For example, the Connection class 900, Statement class 910, and the Resultset Class 920 are not subclasses of specialized templates.

A pointer (906, 916, 923) to memory is associated with each class (900, 910, 920) that is used to create objects in a hierarchical tree. For example, the connection class 900, statement class 910, and the resultset class 920 all have pointers (906, 916, 923) to either a heap or a subheap. Constructors (1000, 1020, 1040) are used to initialize these pointers (906, 916, 923) using initialization instructions (1001, 1021, 1041). For example, connection's constructor 1000, statement's constructor 1020, and resultset's constructor 1040 initialize their respective memory pointers to point to heaps or subheaps in initialization instructions 1001, 1021, and 1041. Factory methods (1010, 1030) are used not only to create new objects of other class types but also to allocate memory for the newly created objects (1011, 1032) and maintain hierarchical data (907, 908, 917, 918, 924, 925) for the memory that reflects the hierarchical relationship between the set of objects. For example, connection's createStatement method 1010: (1) creates a new subheap of the connection object's heap (906) at instruction 1011, (2) creates a statement object and associates the newly created subheap with the statement object at instruction 1012, and (3) maintains hierarchical data, in the form of children and sibling pointers (907 and 908), for the subheaps so that the subheaps reflect the hierarchical relationship between the set of objects at instruction 1013.

By creating objects in factory methods and maintaining hierarchical data in either the memory associated with these objects or as data members of the objects themselves, a subtree and its associated memory can be released with a single request. An example of maintaining the hierarchical data in the memory has already been described herein. Assuming that the hierarchical data is maintained as data members in the objects, a function could use the data members in objects Stmt_1, RS_1, RS_2, and Stream_1, to determine that subheaps H1, H11, H12, H111 should be released.

Other Embodiments

According to another embodiment, all the memory for a hierarchical memory tree is in a single piece of contiguous memory, which is subdivided into separate pieces of memory that are associated with each object in the hierarchical tree. Pointers are used to maintain the relationship between the pieces of memory associated with the individual objects. Any known method for maintaining these pointers may be used such as maintaining the pointers within the single piece of memory itself or maintaining the pointers in a table.

Hardware Overview

Figure 12:
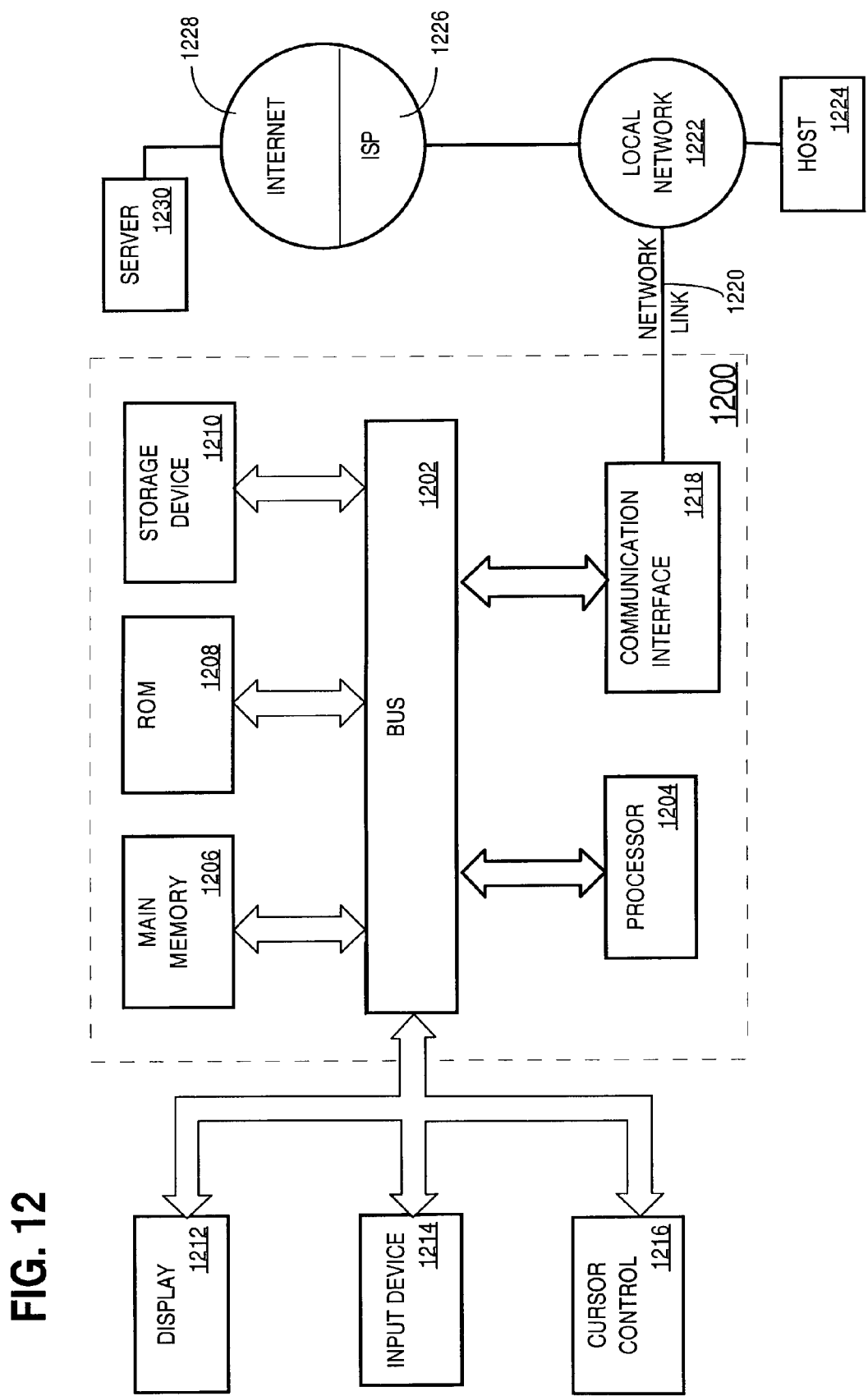
FIG. 12 is a computer system on which an embodiment of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating subclasses having memory management executables generated from common memory management code, comprising the computer-implemented steps of:

generating a first specialized template by passing, as a parameter to a memory management template that includes common memory management interfaces and implementations, a first abstract class of first objects created or accessed for accessing a database, whereby the first specialized template includes memory management executables specialized to the first abstract class and derived from the common memory management interfaces and implementations;

wherein said first objects include at least one from a first hierarchically related group of (a) a database connection object, (b) a database query statement object, (c) a database query result set object, and wherein each of said first objects is associated with a corresponding piece of memory;

generating a second specialized template by passing, as a parameter to the memory management template, a second abstract class of second objects created or accessed for accessing a database, whereby the second specialized template includes memory management executables specialized to the second abstract class and derived from the common memory management interfaces and implementations;

wherein said second objects include at least one object, from said first hierarchically related group, that is different from said at least one object from said first objects, and wherein each of said second objects is associated with a corresponding piece of memory;

subclassing a first specialized template subclass from the first specialized template, wherein the first specialized template subclass provides an implementation for an interface of the first abstract class;

subclassing a second specialized template subclass from the second specialized template, wherein the second specialized template subclass provides an implementation for an interface of the second abstract class; and in response to a particular object of said first or second objects being destroyed, traversing data that represents said hierarchy of said first hierarchically related group to release said pieces of memory associated with said particular object and any objects that are under said particular object in said hierarchy.

2. The method of claim 1, wherein the memory management template includes common memory management code as pre-processor code.

3. The method of claim 1, wherein the step of generating a first specialized template comprises:
replicating the memory management template, and
specializing the replica of the memory management template using the type of the first abstract class.

4. The method of claim 1, wherein interfaces and implementations in the memory management template include interfaces and implementations for new and delete operators.

5. The method of claim 4, wherein common memory management code is provided in the implementation of the new and delete operators.

6. The method of claim 1, wherein the interface of the first abstract class is for a factory method.

7. The method of claim 6, wherein the implementation of the interface of the factory method of the first abstract class in the first specialized template subclass creates an instance of the second specialized template subclass.

8. The method of claim 1, wherein the step of generating the first specialized template occurs during compilation.

9. The method of claim 8, wherein the step of generating the first specialized template occurs during a pre-processor phase of compilation.

10. The method of claim 1, wherein the memory management template includes at least one data member.

11. The method of claim 10, wherein the data member is used to store a pointer to a heap used by the common memory management code.

12. The method of claim 10, wherein the first and second specialized template subclasses include constructor interfaces.

13. The method of claim 12, wherein the interface of the first abstract class is for a factory method, and a statement object is created when the factory method is invoked.

14. A computer-readable medium carrying one or more sequences of instructions for creating subclasses having memory management executables generated from common memory management code, wherein execution of the one or more sequences of instructions by one or more processors causes the one or more processors to perform the steps of:
generating a first specialized template by passing, as a parameter to a memory management template that includes common memory management interfaces and implementations, a first abstract class of first objects created or accessed for accessing a database, whereby the first specialized template includes memory management executables specialized to the first abstract class and derived from the common memory management interfaces and implementations;
wherein said first objects include at least one from a first hierarchically related group of (a) a database connection object, (b) a database query statement object, (c) a database query result set object, and wherein each of said first objects is associated with a corresponding piece of memory;
generating a second specialized template by passing, as a parameter to the memory management template, a second abstract class of second objects created or accessed for accessing a database, whereby the second specialized template includes memory management executables specialized to the second abstract class and derived from the common memory management interfaces and implementations;
wherein said second objects include at least one object, from said first hierarchically related group, that is different from said at least one object from said first objects, and wherein each of said second objects is associated with a corresponding piece of memory;
subclassing a first specialized template subclass from the first specialized template, wherein the first specialized template subclass provides an implementation for an interface of the first abstract class;
subclassing a second specialized template subclass from the second specialized template, wherein the second specialized template subclass provides an implementation for an interface of the second abstract class; and
in response to a particular object of said first or second objects being destroyed, traversing data that represents said hierarchy of said first hierarchically related group to release said pieces of memory associated with said particular object and any objects that are under said particular object in said hierarchy.

15. The computer-readable medium of claim 14, wherein the memory management template includes common memory management code as pre-processor code.

16. The computer-readable medium of claim 14, wherein the one or more sequences of instructions step for generating a first specialized template comprises one or more sequences of instructions for:
replicating the memory management template, and
specializing the replica of the memory management template using the type of the first abstract class.

17. The computer-readable medium of claim 14, wherein interfaces and implementations in the memory management template include interfaces and implementations for new and delete operators.

18. The computer-readable medium of claim 17, wherein common memory management code is provided in the implementation of the new and delete operators.

19. The computer-readable medium of claim 14, wherein the interface of the first abstract class is for a factory method.

20. The computer-readable medium of claim 19, wherein the implementation of the interface of the factory method of the first abstract class in the first specialized template subclass creates an instance of the second specialized template subclass.

21. The computer-readable medium of claim 14, wherein the step of generating the first specialized template occurs during compilation.

22. The computer-readable medium of claim 21, wherein the step of generating the first specialized template occurs during a pre-processor phase of compilation.

23. The computer-readable medium of claim 14, wherein the memory management template includes at least one data member.

24. The computer-readable medium of claim 23, wherein the data member is used to store a pointer to a heap used by the common memory management code.

25. The computer-readable medium of claim 14, wherein the first specialized template subclass is used to create a connection object, the second specialized template subclass is used to create a statement object and a third specialized template subclass is used to create a result set object.

26. The computer-readable medium of claim 25, wherein the interface of the first abstract class is for a factory method, and statement object is created when the factory method is invoked.

27. A method of creating subclasses having memory management executables generated from common memory management code, comprising the computer-implemented steps of:

generating a first specialized template by passing, as a parameter to a memory management template that includes common memory management interfaces and implementations, a first abstract class, whereby the first specialized template includes memory management executables specialized to the first abstract class;

wherein said first objects include at least one from a first hierarchically related group of objects that are associated with a corresponding piece of memory;

generating a second specialized template by passing, as a parameter to the memory management template, a second abstract class, whereby the second specialized template includes memory management executables specialized to the second abstract class;

wherein said second objects include at least one object, from said first hierarchically related group, that is different from said at least one object from said first objects, and wherein each of said second objects is associated with a corresponding piece of memory;

subclassing a first specialized template subclass from the first specialized template, wherein the first specialized template subclass provides an implementation for an interface of the first abstract class;

subclassing a second specialized template subclass from the second specialized template, wherein the second specialized template subclass provides an implementation for an interface of the second abstract class; and in response to a particular object of said first or second objects being destroyed, traversing data that represents a hierarchy of said first hierarchically related group to release said pieces of memory associated with said particular object and any objects that are under said particular object in said hierarchy.

28. A computer-readable medium carrying one or more sequences of instructions for creating subclasses having memory management executables generated from common memory management code, wherein execution of the one or more sequences of instructions by one or more processors causes the one or more processors to perform the steps of:

generating a first specialized template by passing, as a parameter to a memory management template that includes common memory management interfaces and implementations, a first abstract class, whereby the first specialized template includes memory management executables specialized to the first abstract class;

wherein said first objects include at least one from a first hierarchically related group of objects that are associated with a corresponding piece of memory:

generating a second specialized template by passing, as a parameter to the memory management template, a second abstract class, whereby the second specialized template includes memory management executables specialized to the second abstract class;

wherein said second objects include at least one object, from said first hierarchically related group, that is different from said at least one object from said first objects, and wherein each of said second objects is associated with a corresponding piece of memory;

subclassing a first specialized template subclass from the first specialized template, wherein the first specialized template subclass provides an implementation for an interface of the first abstract class;

subclassing a second specialized template subclass from the second specialized template, wherein the second specialized template subclass provides an implementation for an interface of the second abstract class; and in response to a particular object of said first or second objects being destroyed, traversing data that represents a hierarchy of said first hierarchically related group to release said pieces of memory associated with said particular object and any objects that are under said particular object in said hierarchy.

* * * * *

UNITED STATES PATENT AND TRADEMARK OFFICE
CERTIFICATE OF CORRECTION

PATENT NO.        : 7,398,531 B2
APPLICATION NO.   : 10/209469
DATED             : July 8, 2008
INVENTOR(S)       : Lari et al.

Page 1 of 1

It is certified that error appears in the above-identified patent and that said Letters Patent is hereby corrected as shown below:

Title page 2, in column 2, under "Other Publications", line 2, delete "Alllocation" and insert -- Allocation --, therefor.

In column 1, line 19, before "Shoaib" insert -- Mohammad --.

In column 1, line 26, before "Shoaib" insert -- Mohammad --.

In column 1, line 32, before "Shoaib" insert -- Mohammad --.

In column 1, line 38, before "Shoaib" insert -- Mohammad --.

In column 8, line 55, delete "ConnectionAbs>: :operators" and insert -- ConnectionAbs>::operators --, therefor.

In column 10, line 46, delete "HO." and insert -- H0. --, therefor.

In column 18, line 11, in claim 28, delete "memory:" and insert -- memory; --, therefor.

Signed and Sealed this

Tenth Day of November, 2009

David J. Kappos
*Director of the United States Patent and Trademark Office*